United States Patent
French et al.

(10) Patent No.: US 6,826,591 B2
(45) Date of Patent: Nov. 30, 2004

(54) FLEXIBLE RESULT DATA STRUCTURE AND MULTI-NODE LOGGING FOR A MULTI-NODE APPLICATION SYSTEM

(75) Inventors: Steven Michael French, Austin, TX (US); Joseph Herbert McIntyre, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 689 days.

(21) Appl. No.: 09/737,346

(22) Filed: Dec. 15, 2000

(65) Prior Publication Data

US 2002/0078129 A1 Jun. 20, 2002

(51) Int. Cl.$^7$ .............................................. G06F 15/16
(52) U.S. Cl. ..................................... 709/201; 709/200
(58) Field of Search ............................... 709/200, 201, 709/203, 217, 218, 219, 227, 229, 232, 319, 204, 205, 246

(56) References Cited

U.S. PATENT DOCUMENTS

| | | | |
|---|---|---|---|
| 4,438,494 A | | 3/1984 | Budde et al. ............... 364/200 |
| 4,503,535 A | | 3/1985 | Budde et al. ............... 371/11 |
| 5,752,159 A | | 5/1998 | Faust et al. ............... 455/5.1 |
| 5,867,659 A | * | 2/1999 | Otteson ..................... 709/224 |
| 6,079,036 A | * | 6/2000 | Moharram ................. 714/712 |
| 6,119,079 A | * | 9/2000 | Wang et al. ................... 704/8 |
| 6,442,611 B1 | * | 8/2002 | Navarre et al. ............ 709/227 |
| 6,574,628 B1 | * | 6/2003 | Kahn et al. ................ 709/200 |

FOREIGN PATENT DOCUMENTS

| WO | WO 99/65254 | 12/1999 | ............ H04Q/3/66 |
|---|---|---|---|

* cited by examiner

Primary Examiner—Zarni Maung
Assistant Examiner—Hassan Phillips
(74) Attorney, Agent, or Firm—Duke W. Yee; Marilyn Smith Dawkins; Wayne P. Bailey

(57) ABSTRACT

A method, system, and program product for managing result information in a multi-node networked data processing system is provided. In one embodiment, first results of execution from a task executed on a second node in the networked data processing system are received at a first node. The results comprise an array of result messages, wherein each result message contains a unique message identifier and associated message text content. The result messages are modified, if necessary, to create second results, wherein the second results comprise an array of result messages. The second results are sent to a requesting client node.

51 Claims, 5 Drawing Sheets

FLEXIBLE RESULT DATA STRUCTURE AND MULTI-NODE LOGGING FOR A MULTI-NODE APPLICATION SYSTEM

BACKGROUND OF THE INVENTION

1. Technical Field

The present invention relates to an improved networked data processing system and, more particularly, to translating log information in a distributed application environment.

2. Description of Related Art

With the increasing globalization of business, many businesses may find that their computing IT resources are distributed across several countries with servers in one country generating messages and log files in one locale and computers in another country generating messages and log files in a different locale. A locale represents a specific geographical, political or cultural region and encapsulates the information necessary for text to be translated correctly for that locale. Such differences in locale may not be a problem for applications that are executed on a single computer.

However, many software applications are designed such that some processes are executed on one computer while other processes are executed on another computer with the results combined at perhaps still another computer. Each sub-process running on a computer may generate a set of messages and/or log files, perhaps related to errors generated during the execution of the sub-process. Many of these messages and/or log files may need to be sent back to the originating computer. However, currently, the slave computer executing the sub-processes may not know the locale of the originating computer if the originating computer is more than once removed from the computer executing the sub-processes. Therefore, messages and/or log files generated by the computer executing the sub-processes that are passed back to the originating computer are provided in the locale of the slave computer rather than the locale of the originating computer. Thus, an IT manager may be unable to ascertain key pieces of information due to language barrier.

Therefore, it would be desirable to have a message and log management system for providing information to an originating computer in the locale of the originating computer regardless of the locale of the slave computer.

SUMMARY OF THE INVENTION

The present invention provides a method, system, and program product for managing result information in a multi-node networked data processing system. In one embodiment, first results of execution from a task executed on a second node in the networked data processing system are received at a first node. The results comprise an array of result messages, wherein each result message contains a unique message identifier and associated message text content. The result messages are modified, if necessary, to create second results, wherein the second results comprise an array of result messages. The second results are sent to a requesting client node.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
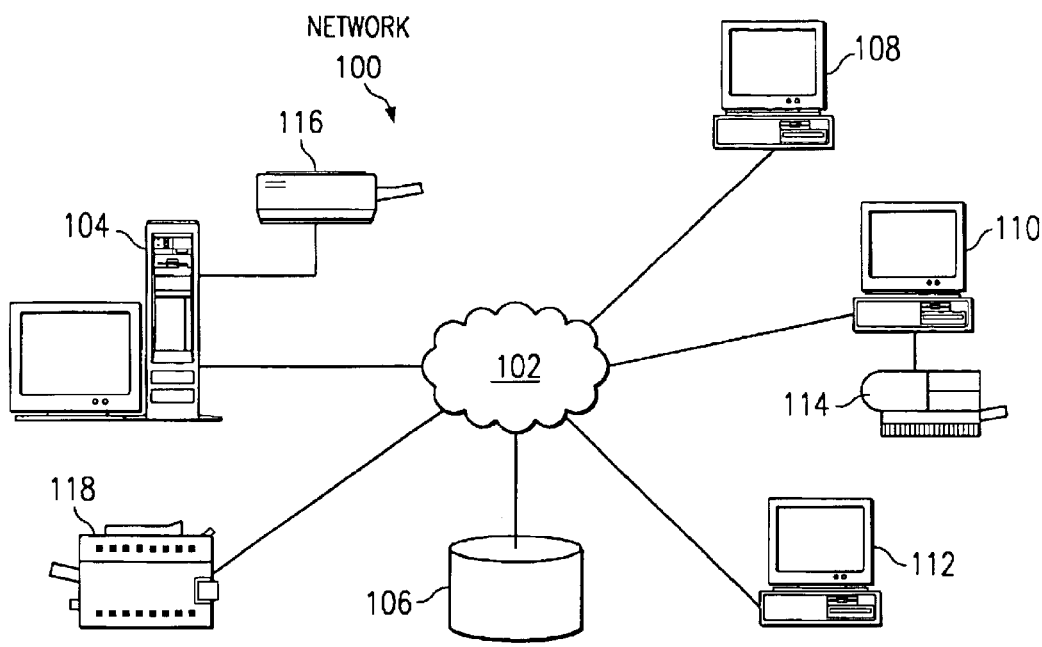
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
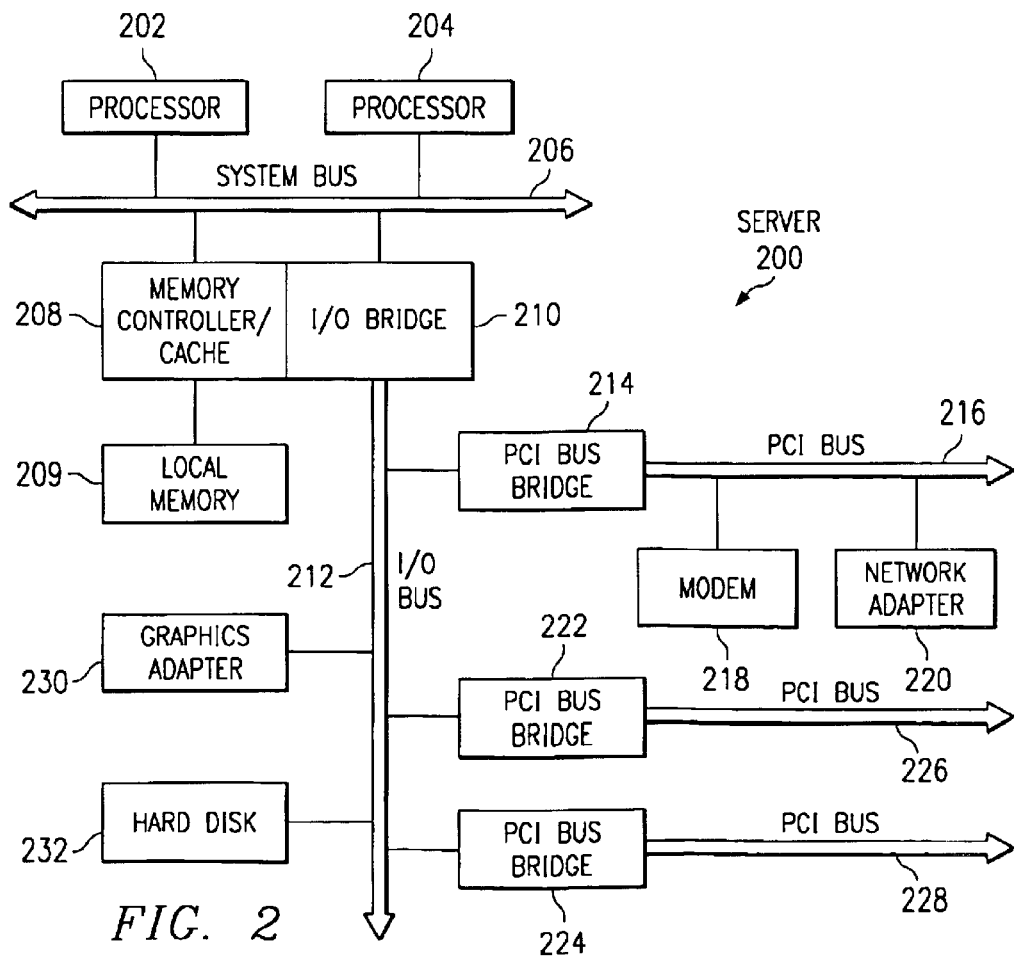
FIG. 2 depicts a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
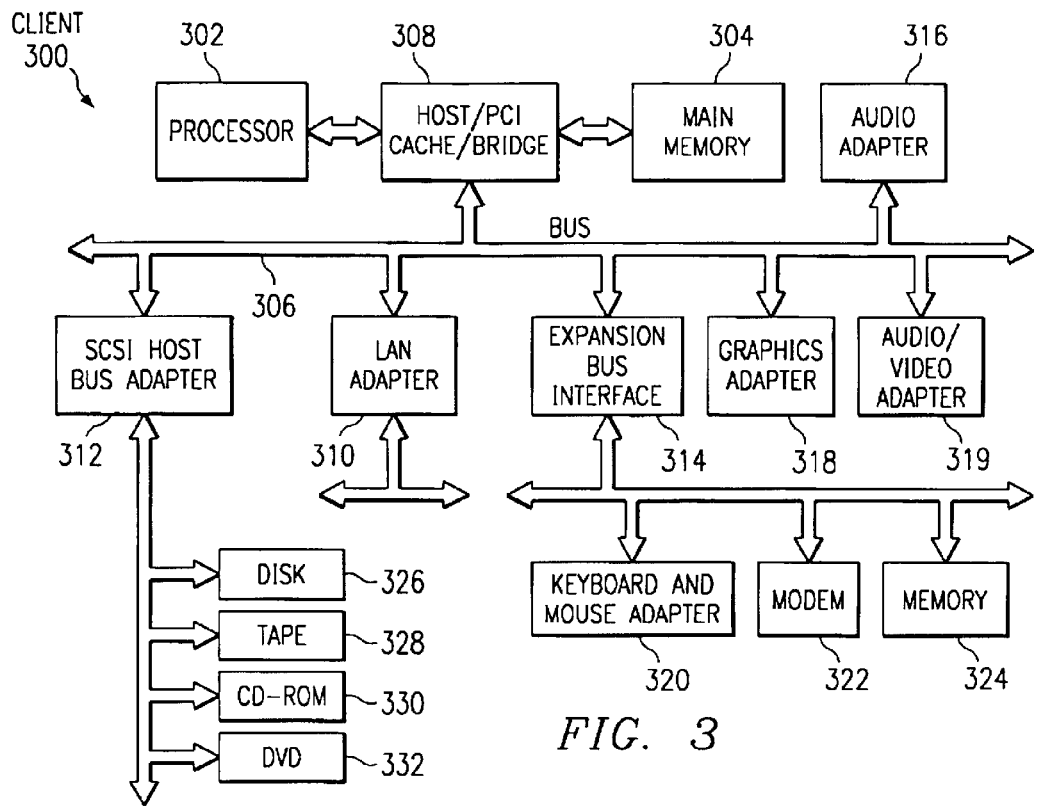
FIG. 3 depicts a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
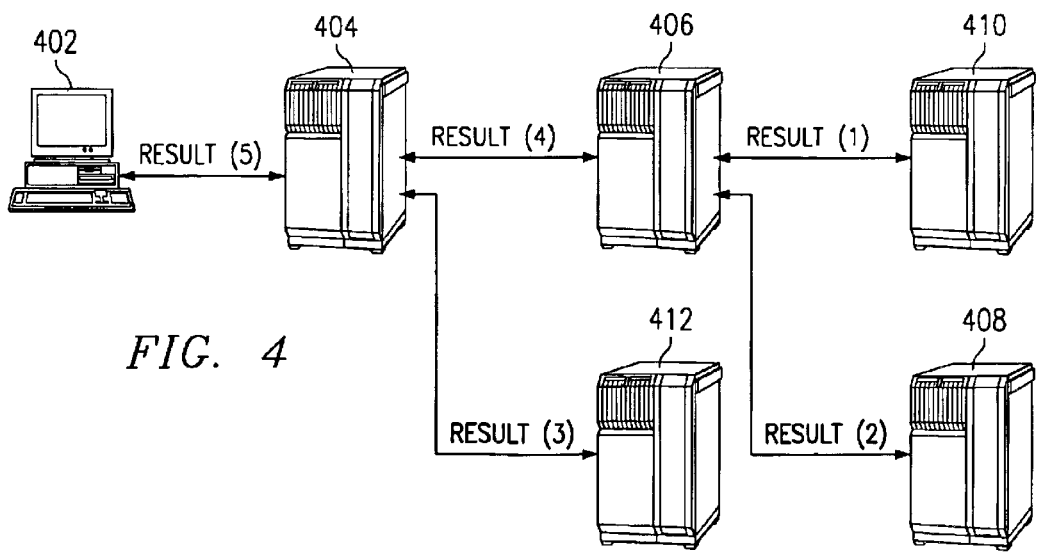
FIG. 4 depicts pictorial diagram illustrating a distributed message and logging system in accordance with the present invention.
Figure 5:
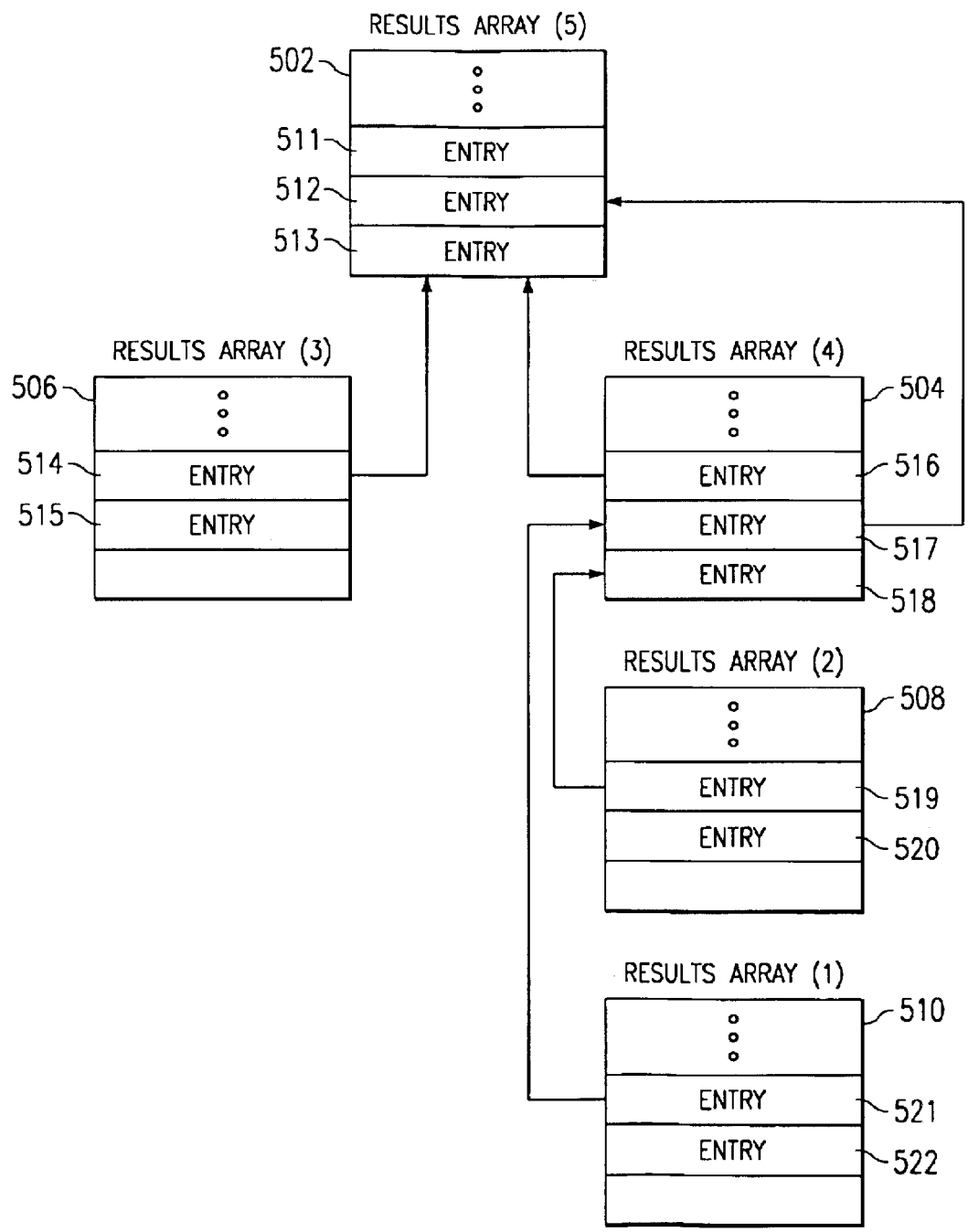
FIG. 5 depicts a block diagram illustrating results arrays for returning results, messages, and log information to a calling node.

Referring now to FIGS. 4–5, FIG. 4 depicts a pictorial diagram illustrating distributed processing of an application task in accordance with the present invention and FIG. 5 depicts a block diagram illustrating status tables and results fields for managing errors encountered by various nodes in performing the distributed task in accordance with the present invention. FIGS. 4–5 together illustrate the novel distributed data processing result manipulation technique of the present invention. In the present invention, results from a piece of a distributed application executed on one node and returned to an upstream node can be manipulated, for example, by translating messages and/or log files into the locale of a requesting client 402 and by modifying or appending results from one node onto results for the upstream node. Client 402 may be implemented, for example, as data processing system 300 in FIG. 3. Each of nodes 404–412 may be a server connected to a network, such as network 102 in FIG. 1 and implemented as, for example, data processing system 200 in FIG. 2.

In a distributed application, client 402 may request a task to be performed by node 404 and in the processing required to complete an application task, node 404 may parcel out sub-tasks for execution on a number of different nodes 406–412. Errors encountered by one of the parceled processes should be reported on the node 406–412 where the process is executing, on the node 404 from which the application task was initiated, and possibly to the requesting client 402. Such reporting is enabled for National Language Support (NLS) so that errors can be reported in each node's 402–412 configured locale. The work vended to one node 406–412 is independent of that vended to another 406–412; all pieces can proceed in parallel and are subject to independent error conditions that may be encountered on each node 406–412.

A result 502–510 is created on each secondary node 404–412 and sent to the node immediately upstream in the chain of nodes. In the distributed application, the results 504–510 contains result data needed to be used by the upstream node 404 as well as messages, such as, for example, error messages, and also may contain potential log entries.

Since the various nodes 404–412 may use different locales (e.g. U.S. English, U.K. English, Spanish, French, and German) and a client 402 connected to node 404 may use still another locale from some of the nodes 404–412 in the network, messages returned to node 404 are translated into the locale of the client, by node 404, by retrieving a message text string corresponding to the message ID for the appropriate client locale. If a message does not have a message ID, or if the message ID is unrecognized by node 404, then node 404 passes the untranslated message text string to the initiating client 402. Thus, even in the worst case scenario, the initiating client 402 receives some feedback from downstream nodes 404 and 406 even if a translation of the message is not available from node 404.

As parcels of work (i.e. application sub-tasks) are completed, the results arrays 502–510 are sent back to the originating node. Each results array 502–510 contains entries 511–522, wherein each entry reflects a result needed by the requesting node or reflects a message or potential log entry. Upon receipt of a results array 502–510, the receiving node 404–412 may take all, part, or none of the entries from the results array 502–510 and place these entries into an entry in its own results array 502–510 to be passed to its requesting node. Furthermore, the entries from the received results array 502–510 may be modified, translated, and/or appended to other entries by the receiving node. If an entry contains log information, the receiving node 404–406 may place the log information into its own log file either modified or unmodified and may also pass the log information on to the node upstream from the receiving node as an entry in its own results array.

Thus, in the depicted example, node 406 receives results array (1) 510 from node 410 and results array (2) 508 from node 408. Results array (1) contains, among other entries, entries 521 and 522 and results array (2) contains, among other entries, entries 519 and 520. Node 406 takes entry 519 from results array (2) 508 and places it into an entry 518 within its own results array (4) 504. Node 406 also takes entry 521 from results array (1) 510 and places it within its own results array (4) 504. Entries 520 and 522 are not placed into results array (4) 504, however, the information contained within entries 520 and 522 may be utilized by node 406 to generate other messages or results that may be placed into its results array (4) 504. Also, if entries 520 or 522 contain log information, this information may be added to a log file generated by and stored on node 406 for its own purposes. For example, if the calling node 406 recognizes that one of the log entries is always generated by the secondary node 410 or 408, the calling node 406 may withhold this information from the calling node 404 rather than writing or passing the information to the calling node 404, since this information is unimportant to the calling node 404.

Similarly, upon receipt of responses 504–506, node 404 consolidates some, all, or none of the entries 514–518 from results arrays 504 and 506 and adds its own entries to results array 502 which is sent back to the requesting client 402. In the depicted example, node 404 takes the information from entry 517 and places into its own results array (5) 502 as entry 512. This information may be entered in entry 512 exactly as it appeared in entry 517 or it may be modified, for example, by appending other information to it or by translating the entry from the locale node 406 into the locale of the requesting client 402.

Some of the entries 514–518 may contain log data. Node 404 may take this log data and add it to its own log. The log information may also be modified by replacing text generated in one locale with corresponding text matching the locale of the node 404. Also, the log information may be appended to other log information or a new log entry may be generated based on the information in the log data received from one of the entries 514–518. To aid in translating entries from one locale to another, each entry 511–522 may include message text and a message ID corresponding to the message or log text. The message ID may be used by the node to identify corresponding translated message text that may be inserted in place of the original message text. These modified log entries may be added to the nodes 404 own log file and/or may be forwarded to the requesting client 402. However, typically, log entries contain information not useful to the user of the requesting client 402 and would not be forwarded as an entry in results array (5) 502 to the requesting client 402.

Similarly, the calling node 404 may write part, all, or none of the log information received from secondary nodes 406–412 into its own log. The calling node 404 may, as desired, write part, none, or all of entries received from nodes 406 and 412 to its results array 502 to be sent to the initiating client 402. The logging system of the present invention provides a distributed log with log information contained on each node, thus providing each individual node more control over the contents of the log as well as providing a log on the initiating node 404 that may contain only information the node 404 determines is important for the initiating client 402.

Thus, one aspect of the present invention provides that a single error occurrence is reported to both the node where the error occurs and on the node that originated the distributed work request. On each node, the error is reported to the display terminal and/or in an error log file. The node receiving a result containing log information may write all, part, or none of the log contents to its own log. The node receiving the log information may forward the log information to its calling node in its received form, may modify the log information, or may substitute alternative information within the result. Log entries are recorded as message identifiers plus replacement text plus plain text, allowing log entries to be recorded in the locale of the node where the log is written.

To aid in understanding the present invention, suppose that node 410 is a Japanese node, node 404 is a French node, node 408 if a Spanish node, and node 406 is a German node and consider the following simple example where the nodes 402–408 in the FIG. 4 each generate one message for the result messages, and where the Japanese 410 and French nodes 404 have US English translations installed for their result messages, but where the Spanish 408 and German nodes 406 do not.

The Japanese node 410 creates a result (1) 412 containing message 1000, with replacement parameters 10 and 90, and produces the US English version of the message in the message text field.

The Spanish node 408 creates a result (2) 414 containing message 1211, with replacement parameter 80, and produces the Spanish version of the message in the message text field, since it does not have a US English version available.

The German node 406 creates a result (3) 416 containing message 9415, with replacement parameter C:\, and produces the German version of the message in the message text field, since it does not have a US English version available.

The French node 404 creates a result (4) 418 containing message 1452, with replacement parameter D:\, and produces the US English version of the message in the message text field.

In preparing the message to return to the client 402, the French node 404 will process each message contained within the result to generate US English messages. In the case of the message generated by the German node 406, if the French node 404 does not have a US English translation for the message, then it will pass through the German text. If it does have a translation, US English will be substituted. Likewise for the message for the Spanish node 408.

Where the nodes 402–410 in an application system share a common message library, the text for a message does not need to be filled in by the node producing the message when it knows there is a node in the return stream that will be able to provide the translation for the message. In the case where the message is not from the common message library, the text should be filled in. This optimization is common for systems that have multiple nodes, and where the nodes have master/slave relationships—the slave can make this optimization with knowledge that its caller has this translation capability.

Figure 6:
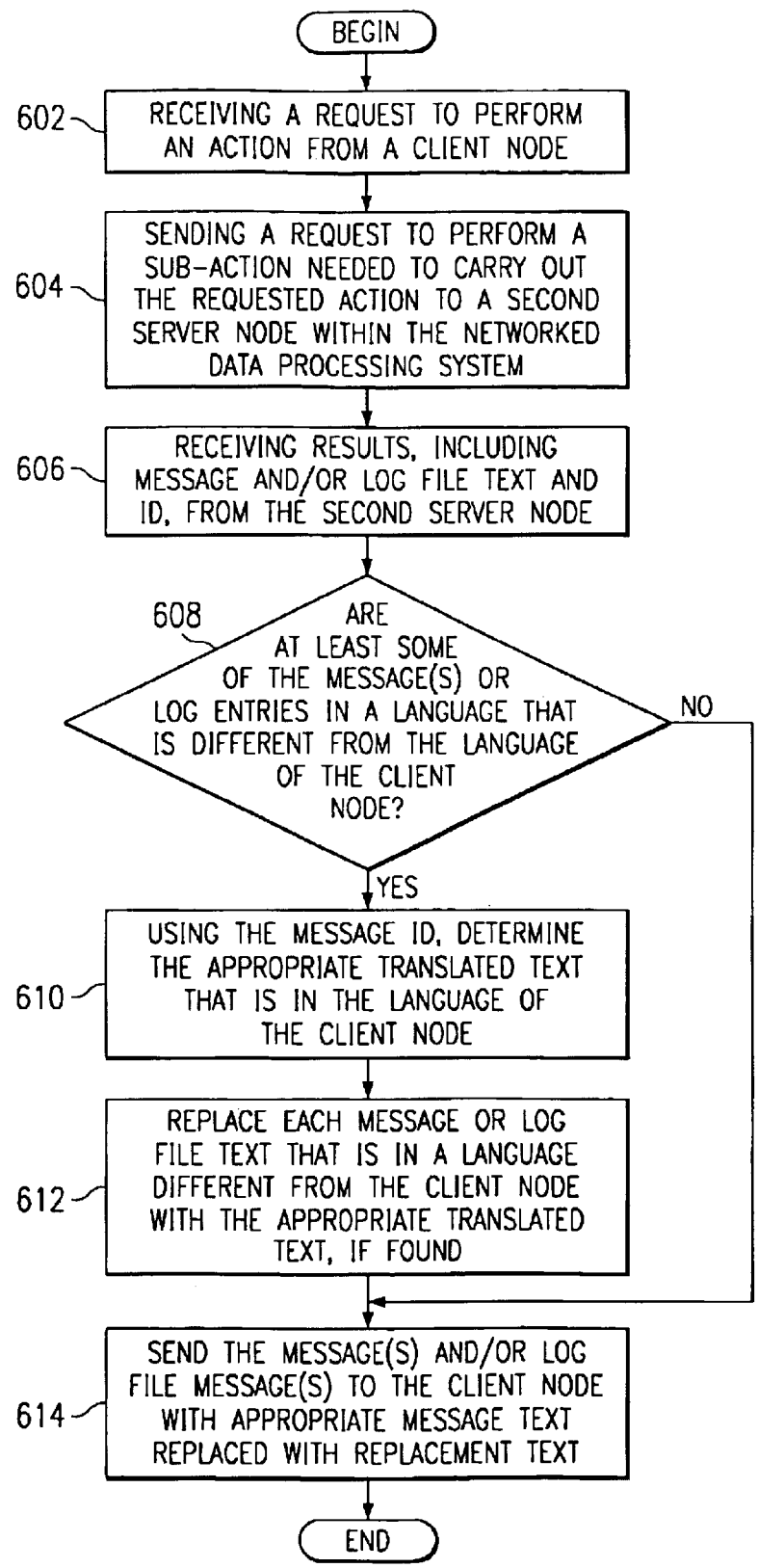
FIG. 6 depicts a diagram illustrating program flow in accordance with the present invention.

With reference now to FIG. 6, a diagram illustrating program flow is depicted in accordance with the present invention. A server, such as server 404 in FIG. 4 receives a request to perform an action from a client node 402 in FIG. 4 (step 602). The server sends a request to perform a sub-action needed to carry out the requested action to a second server node with the network, such as, for example, network 100 in FIG. 1 (step 604). The first server then receives the results, including result messages and/or log messages, from the second server node (step 606). If the result message(s) and/or log message(s) are in the locale of the client node (step 608), then the first server does not need to translate the result message(s) and/or log message(s) and merely sends the result message(s) and/or log message(s) to the client node (step 614).

If the result message(s) and/or log message(s) are in a locale that is different from the locale of the client node (step 608), then, using the message ID, the server determines the appropriate translated text that is in the locale of the client node (step 610). The server then replaces each result message or log message text that is in a locale different from the client node with the appropriate translated text, if that translated text is found (step 612). The first server then sends the result message(s) and/or log message(s) to the client node with the appropriate result message or log message text replaced with translated text (step 614). If no replacement text is found, then the first server sends the result message(s) or log message(s) to the client node unmodified.

Figure 7:
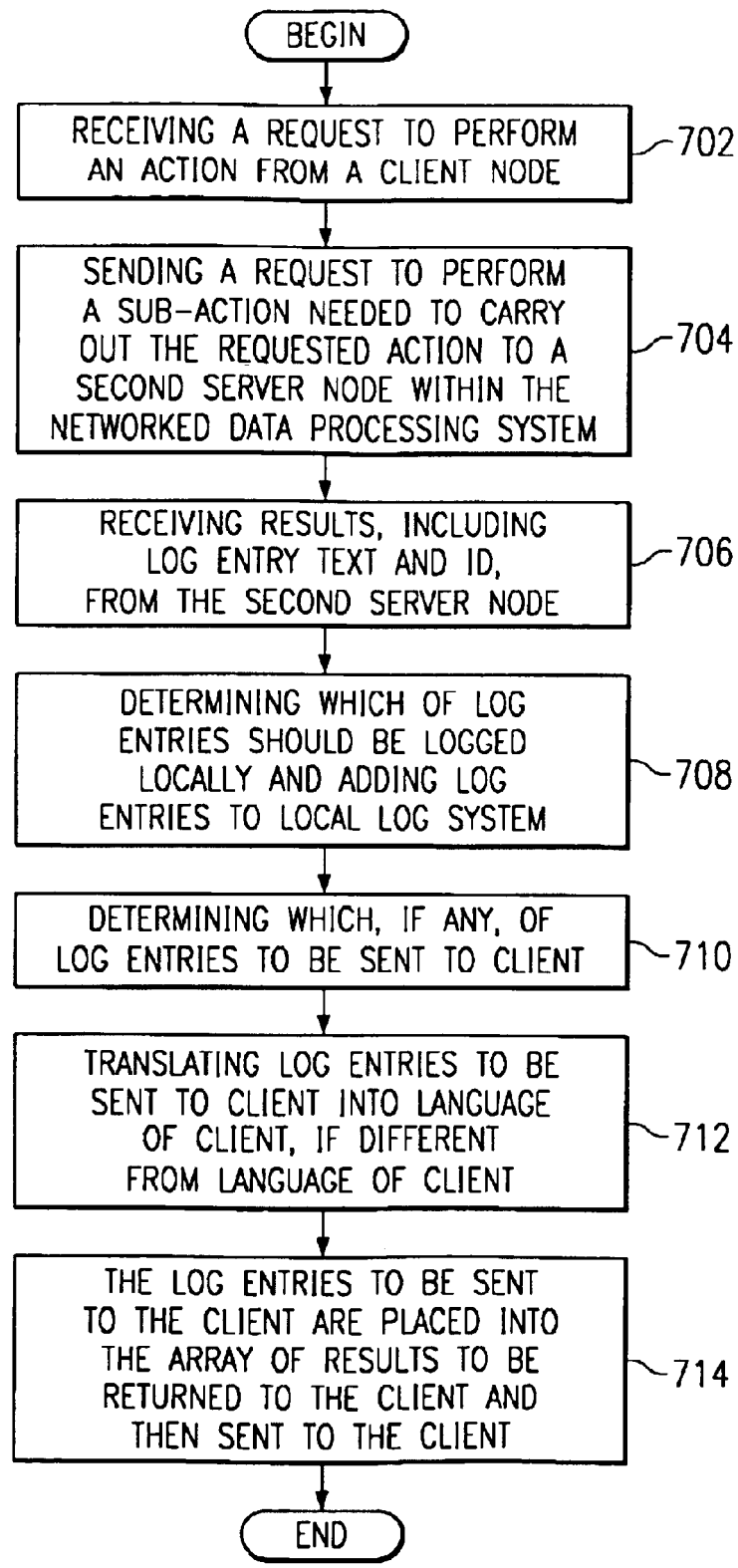
FIG. 7 depicts a diagram illustrating program flow for manipulating log entries for a distributed application in a multi-node networked data processing system in accordance with the present invention.

With reference now to FIG. 7, a diagram illustrating program flow for manipulating log entries for a distributed application in a multi-node networked data processing system is depicted in accordance with the present invention. To begin, a primary server node in the networked data processing system receives a request to perform an action from a client node (step 702). The primary server node sends a request to perform a sub-action needed to carry out the requested action to a second server node within the networked data processing system (step 704). The primary server node then receives the results, including log entry text and ID, from the second server node (step 706). The primary server node determines which of the log entries should be logged locally and adds the appropriate log entries, if any, to the local log system (step 708). Those of ordinary skill in the art will appreciate that the local log system may be implemented in various ways without affecting this invention. Some operating systems include more than one type of log file (within the local log system) based on the type of information to be logged, for example: the system log, the application log and the security log (audit log). The target log to be used is often implied by the log ID (or message identifier). Also note that the log entries added to the local log system may be modified prior to entering them into the local log system. For example, if the log text is in a locale different from the locale of the primary server node, then the log entry text is replaced by appropriate translated log text determined by the log ID. Thus, for example, if the log ID is 20, the primary server node determines the log entry text corresponding to log ID 20 in the locale of the primary server node from a table of log Ids and translation text.

The primary server node then determines which, if any, of the log entries should be sent to the client (step 710). Any log entries that are to be sent to the client are translated into the locale of the client if the current locale of the log entry is different from the locale of the client (step 712). This translation is performed using the log ID as described above. The log entries to be sent to the client are placed into the array of results to be returned to the client and then sent to the client (step 714).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing result information in a multi-node networked data processing systems, the method comprising:

receiving, at a first node, first results of execution from a task executed on a second node in the networked data processing system, wherein the first results comprise an array of result messages;

modifying, at the first node, at least one of the result messages to create second results, wherein the second results comprise a second array of result messages including the modified result message(s);

receiving, at a third node, the second results;

modifying, at the third node, at least one of the second result messages to create third results, wherein the third results comprise a third array of result messages including the modified second result message(s); and sending the third results to a requesting client node.

2. The method as recited in claim 1, wherein the result messages comprise at least one log entry.

3. The method as recited in claim 2, wherein the log entry comprises a system log.

4. The method as recited in claim 2, wherein the log entry comprises a security log.

5. The method as recited in claim 2, wherein the log entry comprises an audit log.

6. The method as recited in claim 2, wherein the log entry comprises an application log.

7. The method as recited in claim 1, wherein at least one of the entries in the result messages is an error message and includes a severity field indicating a severity of the error.

8. The method as recited in claim 7, wherein the severity field is a warning.

9. The method as recited in claim 7, wherein the severity field is an informational field.

10. A method for transmitting log entries within result data structures through a chain of nodes in a multi-node networked data processing system, the method comprising:

sending, from a first node, a command request to a second node;

receiving, at the first node, a result of execution from the second node, wherein the result of execution contains both a program result from one or more tasks executed and a set of log messages, wherein each log message contains a unique identifier and associated text content; and modifying, at the first node, at least one of the log messages in the set of log messages received in the result to produce a modified result and appending the modified result to an existing log system on the first node, the existing log system comprising a first node result of execution from one or more tasks executed by the first node.

11. The method as recited in claim 10, further comprising: transmitting the modified result to a requesting node.

12. The method as recited in claim 10, wherein at least some of the set of log messages in the modified result are identical to corresponding log messages in the result.

13. The method as recited in claim 10, wherein the modified result contains all of the log messages contained within the result.

14. The method as recited in claim 10, wherein the modified result contains none of the log messages contained within the result.

15. The method as recited in claim 10, wherein the step of modifying comprises placing a modified log entry in the modified results corresponding to an unmodified log entry in the set of log messages in the results.

16. The method as recited in claim 10, wherein modifying the set of log messages comprises translating at least one of the log entries in the set of log entries from a first language into a primary language of the requesting client node if the first language is different from the primary language of the requesting client node.

17. The method as recited in claim 16, wherein the translating the log entries comprises matching the message identification of a log entry with a corresponding replacement text in the primary language of the requesting client node.

18. A computer program product in a computer readable media for use in a data processing system for managing result information in a multi-node networked data processing system, the computer program product comprising:

first instructions for receiving, at a first node, first results of execution from a task executed on a second node in the networked data processing system, wherein the first results comprise an array of result messages;

second instructions for modifying, at the first node, at least one of the result messages to create second results, wherein the second results comprise a second array of result messages including the modified result message(s);

third instructions for receiving, at a third node, the second results;

fourth instructions for modifying, at the third node, at least one of the second result messages to create third results, wherein the third results comprise a third array of result messages including the modified second result message(s);

fifth instructions for sending the third results to a requesting client node.

19. The computer program product as recited in claim 18, wherein the result messages comprise at least one log entry.

20. The computer program product as recited in claim 19, wherein the log entry comprises a system log.

21. The computer program product as recited in claim 19, wherein the log entry comprises a security log.

22. The computer program product as recited in claim 19, wherein the log entry comprises an audit log.

23. The computer program product as recited in claim 19, wherein the log entry comprises an application log.

24. The computer program product as recited in claim 18, wherein at least one of the entries in the result messages is an error message and includes a severity field indicating a severity of the error.

25. The computer program product as recited in claim 24, wherein the severity field is a warning.

26. The computer program product as recited in claim 24, wherein the severity field is an informational field.

27. A computer program product in a computer readable media for use in a data processing system for transmitting log entries within result data structures through a chain of nodes in a multi-node networked data processing system, the computer program product comprising:

first instructions for sending, from a first node, a command request to a second node;

second instructions for receiving, at the first node, a result of execution from the second node, wherein the result of execution contains both a program result from one or more tasks executed and a set of log messages, wherein each log message contains a unique identifier and associated text content; and third instructions for modifying, at the first node, at least one of the log messages in the set of log messages received in the result to produce a modified result and appending the modified result to an existing log system on the first node, the existing log system comprising a first node result of execution from one or more tasks executed by the first node.

28. The computer program product as recited in claim 27, further comprising:

fourth instructions for transmitting the modified result to a requesting node.

29. The computer program product as recited in claim 27, wherein at least some of the set of log messages in the modified result are identical to corresponding log messages in the result.

30. The computer program product as recited in claim 27, wherein the modified result contains all of the log messages contained within the result.

31. The computer program product as recited in claim 27, wherein the modified result contains none of the log messages contained within the result.

32. The computer program product as recited in claim 27, wherein the step of modifying comprises placing a modified log entry in the modified results corresponding to an unmodified log entry in the set of log messages in the results.

33. The computer program product as recited in claim 27, wherein modifying the set of log messages comprises translating at least one of the log entries in the set of log entries from a first language into a primary language of the requesting client node if the first language is different from the primary language of the requesting client node.

34. The computer program product as recited in claim 33, wherein the translating the log entries comprises matching the message identification of a log entry with a corresponding replacement text in the primary language of the requesting client node.

35. A system for managing result information in a multi-node networked data processing system, the system comprising:
   first means for receiving, at a first node, first results of execution from a task executed on a second node in the networked data processing system, wherein the first results comprise an array of result messages;
   second means for modifying, at the first node, at least one of the result messages to create second results, wherein the second results comprise a second array of result messages including the modified result message(s);
   third means for receiving, at a third node, the second results;
   fourth means for modifying, at the third node, at least one of the second result messages to create third results, wherein the third results comprise a third array of result messages including the modified second result message(s);
   fifth means for sending the second results to a requesting client node.

36. The system as recited in claim 35, wherein the result messages comprise at least one log entry.

37. The system as recited in claim 36, wherein the log entry comprises a system log.

38. The system as recited in claim 36, wherein the log entry comprises a security log.

39. The system is recited in claim 36, wherein the log entry comprises an audit log.

40. The system as recited in claim 36, wherein the log entry comprises an application log.

41. The system as recited in claim 35, wherein at least one of the entries in the result messages is an error message and includes a severity field indicating a severity of the error.

42. The system as recited in claim 41, wherein the severity field is a warning.

43. The system as recited in claim 41, wherein the severity field is an informational field.

44. A system for transmitting log entries within result data structures through a chain of nodes in a multi-node networked data processing system, the system comprising:
   first means for sending, from a first node, a command request to a second node;
   second means for receiving, at the first node, a result of execution from the second node, wherein the result of execution contains both a program result from one or more tasks executed and an array of log messages, wherein each log message contains a unique identifier and associated text content; and
   third means for modifying, at the first node, at least one of the log messages in the set of log messages received in the result to produce a modified result and appending the modified result to an existing log system on the first node, the existing log system comprising a first node result of execution from one or more tasks executed by the first node.

45. The system as recited in claim 44, further comprising:
   fourth means for transmitting the modified result to a requesting node.

46. The system as recited in claim 44, wherein at least some of the set of log messages in the modified result are identical to corresponding log messages in the result.

47. The system as recited in claim 44, wherein the modified result contains all of the log messages contained within the result.

48. The system as recited in claim 44, wherein the modified result contains none of the log messages contained within the result.

49. The system as recited in claim 44, wherein the step of modifying comprises placing a modified log entry in the modified results corresponding to an unmodified log entry in the set of log messages in the results.

50. The system as recited in claim 44, wherein modifying the set of log messages comprises translating at least one of the log entries in the set of log entries from a first language into a primary language of the requesting client node if the first language is different from the primary language of the requesting client node.

51. The system as recited in claim 50, wherein the translating the log entries comprises matching the message identification of a log entry with a corresponding replacement text in the primary language of the requesting client node.

* * * * *